(12) United States Patent
Eapen

(10) Patent No.: US 12,189,728 B2
(45) Date of Patent: Jan. 7, 2025

(54) PHYSICAL SIGNATURE AUTHORIZATION VIA A PORTAL

(71) Applicant: NCR Voyix Corporation, Atlanta, GA (US)

(72) Inventor: Arun George Eapen, Kitchener (CA)

(73) Assignee: NCR Voyix Corporation, Atlanta, GA (US)

( * ) Notice: Subject to any disclaimer, the term of this patent is extended or adjusted under 35 U.S.C. 154(b) by 255 days.

(21) Appl. No.: 17/734,010

(22) Filed: Apr. 30, 2022

(65) Prior Publication Data

US 2023/0350987 A1 Nov. 2, 2023

(51) Int. Cl.
*G06F 21/31* (2013.01)

(52) U.S. Cl.
CPC .................................. *G06F 21/31* (2013.01)

(58) Field of Classification Search
None
See application file for complete search history.

(56) References Cited

U.S. PATENT DOCUMENTS

| | | | |
|---|---|---|---|
| 11,436,597 B1* | 9/2022 | Griffin | H04L 9/30 |
| 2016/0035053 A1* | 2/2016 | Gerhardt | G06F 21/64 |
| | | | 705/316 |
| 2017/0011456 A1* | 1/2017 | Parsells | G06Q 40/02 |
| 2019/0123889 A1* | 4/2019 | Schmidt-Karaca | H04L 9/0618 |
| 2020/0076612 A1* | 3/2020 | Adluri | H04L 9/3239 |
| 2020/0234277 A1* | 7/2020 | Dabney | G06Q 20/3224 |
| 2021/0211299 A1* | 7/2021 | Hussain | H01Q 15/14 |
| 2023/0019652 A1* | 1/2023 | Lomonaco | H04L 12/1822 |

FOREIGN PATENT DOCUMENTS

WO WO-2015088986 A1 * 6/2015 ........... H04L 9/3228

* cited by examiner

*Primary Examiner* — Benjamin E Lanier
(74) *Attorney, Agent, or Firm* — Schwegman Lundberg & Woessner, P.A.

(57) ABSTRACT

Users and providers register with a portal. Users are provided codes that link to the portal and contact information for the users. When a provider needs a user to physically sign a document, the user presents the code for scanning by a provider device, this redirects the document and the code to the portal. A ledger is maintained on the portal for the transaction, the portal forwards the document to the user using the contact information. The user uses an application to review the document and accept or reject the document. When the user accepts the document, a physical signature of the user is placed within the document at signature locations and forwarded back to the portal. The portal updates the ledger indicating the user physically signed and forwards the physically signed document to the provider. Neither the unsigned document nor the physically signed document are stored on the portal.

8 Claims, 3 Drawing Sheets

PHYSICAL SIGNATURE AUTHORIZATION VIA A PORTAL

BACKGROUND

One's physical signature is an important tool for authentication and authorization. Whether it is a car repair shop, full-service gas station, post office, drive test center, or cashing in a winning lottery ticket, everywhere one goes authorization of one's physical signature is performed.

There are cases when the service provider has to provide that scribbles on a document represents a client's physical signature and cases where a client has to provide signature forgery resulted in a criminal offence against the client.

In fact, very little business can be conducted without physical signatures. Physical signatures offer proof that the client consented to something, such as making a purchase, agreeing to retain someone under contract to perform some agreed to work, acknowledging risks for a medical procedure, etc. Providers are often required by law to retail the signed documents. Banks have strict governmental compliance rules that require customers acknowledge risks before the client uses any service offered by the bank and records must be maintained for government audits.

Physical or wet signatures are still needed at some organizations, such as the post office, delivery confirmation from delivery services, grocery stores for check cashing, some kiosk transactions, etc.

The problem with physical signatures is 1) it is assumed the documents with the signatures are handled and disposed of in secure and ethical manners; 2) during the pandemic no one wanted to physically touch or share a pen and paper nor did they want to touch a kiosk that everyone else was touching; 3) the signatures on documents rarely hold up in court since they do not match a person's actual signature (people frequently change their signatures), this could lead to fraud and at other times situations where the client claims that the authentication of their signature was fraudulent; 4) a paper trail is created, which is environmentally unfriendly; 5) some documents are signed dilatorily after they were achieved in a ledger, which would void the signatures.

SUMMARY

In various embodiments, methods and a system for authorizing a physical signature via a portal are presented.

According to an aspect, a method for authorizing a physical signature via a portal, is presented. A code and a document supplied by a provider are received. A user is identified from the code and the document is forwarded to the user. A physically signed document is received from the user and the physically signed document is forward to the provider. A record is maintained for the document, the provider, the user, and an indication that the user provided the physically signed document. The record does not include the document or the physically signed document.

DETAILED DESCRIPTION

Figure 1:
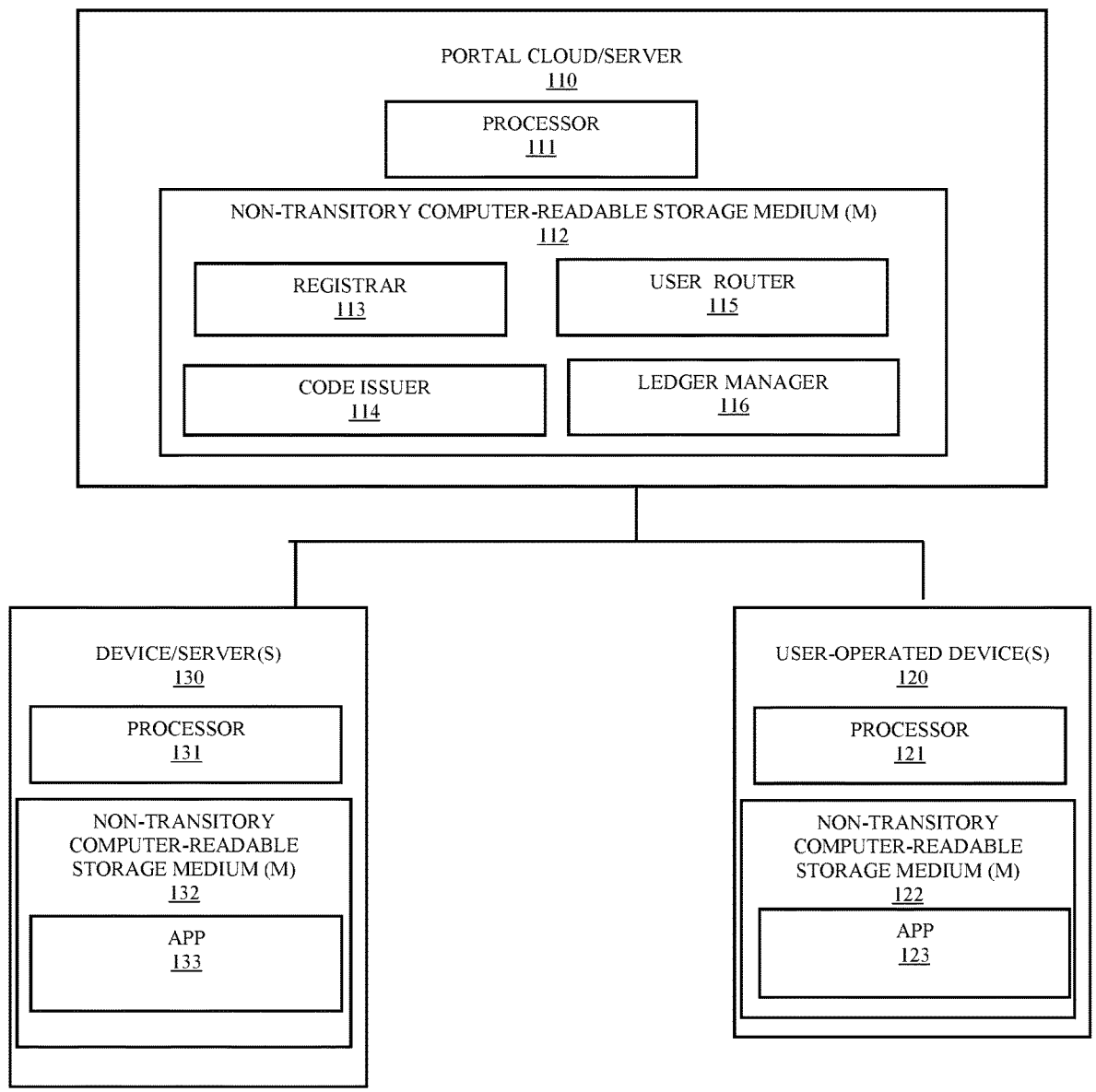
FIG. 1 is a diagram of a system for authorizing a physical signature via a portal, according to an example embodiment.

FIG. 1 is a diagram of a system 100 authorizing a physical signature via a portal, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of authorizing a physical signature via a portal as presented herein and below.

As will be discussed in the various embodiments that follow, the teachings provide techniques by which a user can receive a document from a provider via a third-party portal that the user is registered with, review the document and accept the document (which causes a users signature to be inserted in the proper locations within the document, or reject the document). The portal registers at least the users for uses of the signature authentication techniques and distributes codes to the users. The codes comprise a link to the portal and identifying information associated with electronically reaching the user, such as an email or a phone number. The providers provide documents with embedded tags that identify where the users' signatures are being required. When a provider has a document that the user is required to sign, the user presents the registered code on a display of the user's mobile device to the provider. The provide uses their phone to scan the code using a mobile application and their mobile device's camera.

This causes the provider's document to be sent to the portal, the portal identifies the user via the code scanned by the provider and sends the document with the embedded tags to the user's device (using the phone number or email). The user opens the document requiring signature within the mobile application (app) where the user reviews the document and either accepts or rejects it. When the user accepts it, the app applies a user's stored signature to the tagged locations within the document and sends the signed document back to the portal, the portal forwards the signed document to the provider. The portal does not retain the document, does maintain a ledger as non-reputable information indicating that the user did sign the particular document from their mobile device on a specific data and time. Cryptographic codes may be maintained in the ledger as irrefutable evidence the user signed the document.

As used herein, the terms "consumer," "customer," "user," and/or "client" may be used interchangeably and synonymously herein and below. This refers to an individual that is being requested to sign a document provided by a provider. A provider is an individual or entity that has a document which the client is required to sign for some business or activity associated with the provider.

Herein, the phrase "physically signed document" refers to an electronic document that has an actual image version of a user's physical signature inserted into the signature line(s) of the electronic document and the insertion is performed by affirmative actions of user performed a user-operated device.

System 100 comprises a portal cloud/server 110, a plurality of customer-operated devices 120, one or more retail servers 130, and a plurality of in-store transaction terminals 140.

Portal cloud/server 110 comprises at least one processor 111 and a non-transitory computer-readable storage medium 112. Medium 112 comprises executable instructions for one or more registrar 113, a code issuer 114, a user router 115, and a ledger manager 116. The executable instructions when executed by processor 111 from the medium 112 cause processor 111 to perform operations discussed herein and below with respect to 113-116.

Each customer-operated device 120 comprises a processor 121 and a non-transitory computer-readable storage medium 122. Medium 122 comprises executable instructions for a mobile app 123. The executable instructions when executed by processor 121 from medium 122 cause processor 121 to perform operations discussed herein and below with respect to app 123.

Each device/retail server 130 comprises a processor 131 and a non-transitory computer-readable storage medium 132. Medium 132 comprises executable instructions for an app 133. The executable instructions when executed by processor 131 from medium 132 cause processor 131 to perform operations discussed herein and below with respect to 133.

Initially, users and providers register for access to the authentication portal 110 via registrar 113. Users and provides provide information such as phone number, email, name, etc. Apps 133 and 123 are downloaded to a provider device 130 and user device 120. In an embodiment, the apps 133 and 123 are hosted by portal 110 and accessed via web pages rendered through browsers of 130 and 120. So, apps 133 and 123 can be device-based apps or web-based apps.

For the users, registrar 113 returns a unique code back to app 123 for storage, such as a Quick Response (QR) code that is encoded with a Uniform Resource Locator (URL) link to the portal 110 and encoded with the user's phone number or email. Registrar 113 also interacts with provider app 133 to instruct the provider on how to select locations of a given document for which tags will be inserted by app 133. The tags identify the locations within the document that require a user's signature. App 123 is configured to recognize these tags and place a user's signature when the provider documents are received by app 123 and when the user accepts the provider documents within app 123.

Also, the user uses app 123 during registration to create a wet signature of the user. This can be done by uploading an image of the signature available on the user device 120 or can be done by the user using a stylus or their finger to provide the signature within a user-facing interface signature capture screen of app 123. The signature is saved by app 123 for subsequent use by the user when signing documents.

At this point, the user has a physical signature that was electronically captured, has a code encoded with contact information for the user and an URL to the portal. The provider has an app 133 that allows signature locations within documents to be tagged.

During operation, the user is asked to sign a document by a provider. In response, the user pulls up app 123 and displays the code that was registered with registrar 113. The provider pulls up app 133 and uses a camera of device 130 to scan the code (QR code) off the display of device 120. Provider attaches the tagged document that needs signed and app 133 sends the tagged document and the scanned code to the URL embedded in the code, which redirects the document and the code to portal 110.

User router 115 of portal 110 assigns a unique identifier to the document (note this can also be done by app 133), assigns current date, assigns a current time of day, assigns a provider identifier for the provider, and assigns a user identifier for the user in a record. The record is stored by ledger manager 116 in a data store or log of signature activity. The document sent by app 133 may also be signed with a cryptographic signature signature of device 130, user router can verify and store the cryptographic device signature signature in the record and ledger manager 116 stores with the record in the data store or the log.

Next, user router 115 decodes the user contact information from the code and forwards the document to the user on device 120. App 123 identifies the document and loads the document within a user-facing interface of app 123 for review by the user. The user is presented with two options accept or reject. Assuming the user accepts the document, app 123 navigates to the tags within the document and inserts the user's physical signatures within the document between the tags. The signed document is then sent back to portal 110, the document unique identifier is linked to the provider, such that user-router 115 can route the physically signed document back to app 133 for the provider to review, store, or do what ever else is needed by the provider with the document. The signed document may be cryptographic signed by device 120 (cryptographic device signature linked to device 120 and the document) before app 123 sends the signed document back to portal 110. User router 115 may extract out the cryptographic signature and stores (using ledger manager) the cryptographic device signature on the document with an indication that the document was physically signed by the user within the record associated with the transaction.

The portal 110 does not retain the document nor the physically signed document, rather, unique details about the document, the provider (provider cryptographic device signature on the unique document), and the user (user cryptographic device signature on the physically signed document) along with current dates and current times of days are stored in a record for the transaction through ledger manager 116. In this way, when a user accepts a document and signs it via app 123, the record in the ledger provides irrefutable evidence or proof that the user did in fact provide a true physical signature and signed the document. Either the provider or the user can rely on the ledger maintained by ledger manager 116 as evidence that is cryptographically provable via the record maintain comprising the cryptographic device signature by the provider device 130 on the document and the cryptographic device signature by the user device 120 on the physically signed document.

The portal 110 merely forwards the documents (unsigned and signed) between the parties while maintain a cryptographically provable ledger that does not allow either party (provider or user) to repudiate their actions that were recorded in the ledger. At no point does any physical paper representing the document get printed or passed (although both the provider and the user are free to print hardcopies via app 133 and 123 if so desired). Moreover, the provider and user do not engage one another in any physical contact that may be conducive to virus spreading. Still further, even if the portal 110 was hacked, the document and the physical signature of the user would not be present in the ledger only a record with cryptographic device signatures that are tied to the documents (unsigned and signed) such that they would be of no value to the hacker. Thus, system 100 provides an improved and secure manner by which physical signatures can be obtained on documents in a non-repudiation manner.

In an embodiment, when a user via app 123 rejects a document from the provider, the rejection is forwarded back to app 133 of the provider through user router 115 and the rejection is recorded in the records along with the cryptographic signature of device 120 on the unsigned document.

In this way, provider is unable to assert that the user signed the document when the user rejected the document.

In an embodiment, device/server 130 is a phone, a laptop, a server of a provider, a wearable processing device, a tablet computer, or a desktop computer.

In an embodiment, device 120, is a phone, a laptop, a wearable processing device, and/or a tablet computer.

In an embodiment, the cryptographic device signatures are signed using a private key of a signing device 130 or 120 based on the actual text information of the document (unsigned and provided by the provider or physically signed and provided by the user) and a uniquely assigned document identifier. The private keys are not maintained by portal 110 and are not accessible outside the corresponding devices 120 and 130.

In an embodiment, rather that cryptographic device signatures other cryptographic nonces or values may be generated and stored in the record of the ledger, such as a hash value on the unique document identifier, the provider identifier, the user identifier, the provider device 130 identifier, the user device 120 identifier, the current calendar date, the current time of day, etc.

The above-referenced embodiments and other embodiments are now discussed with reference to FIGS. 2-3.

Figure 2:
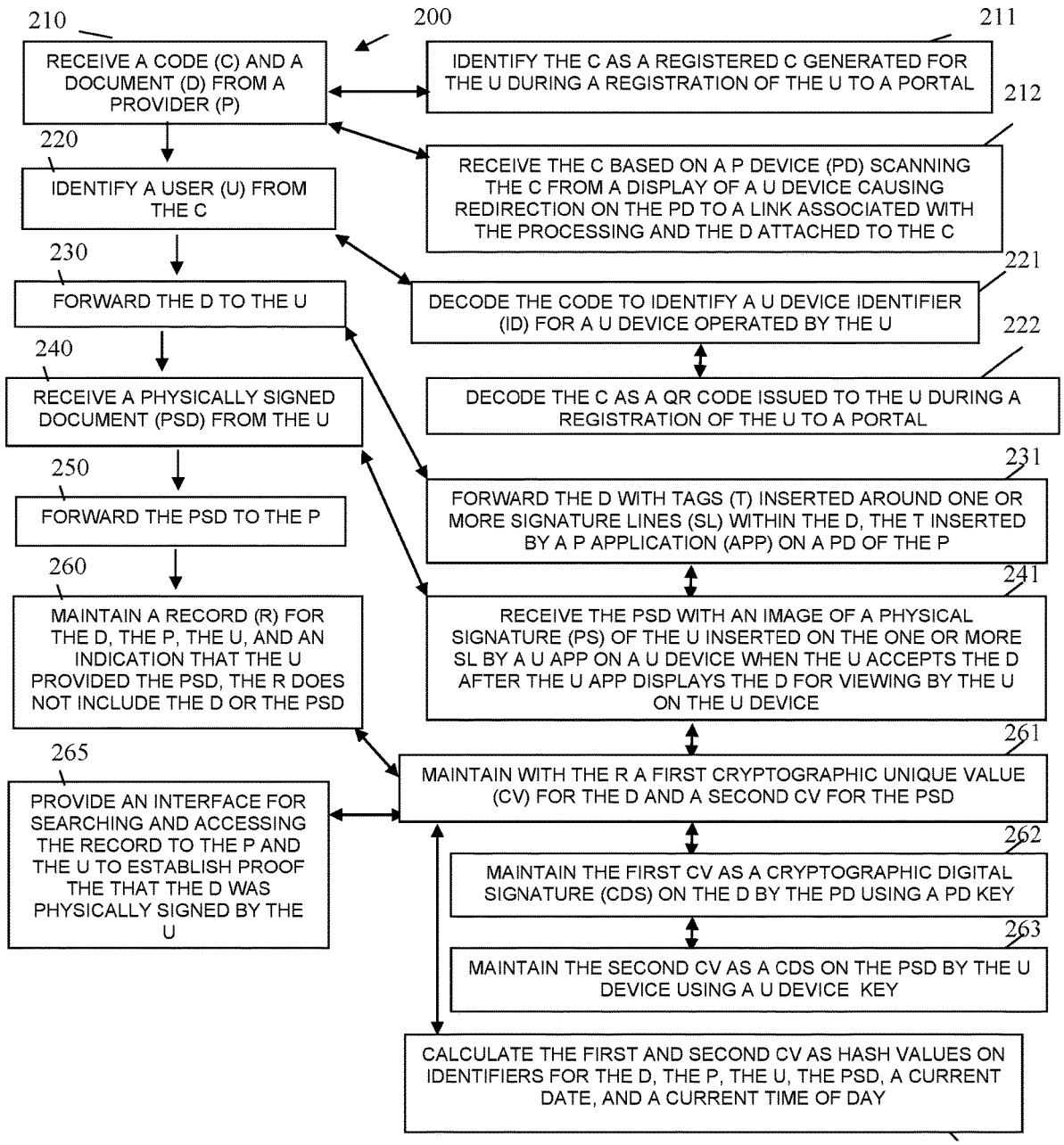
FIG. 2 is a diagram of a method for authorizing a physical signature via a portal, according to an example embodiment.

FIG. 2 is a diagram of a method 200 for authorizing a physical signature via a portal, according to an example embodiment. The software module(s) that implements the method 200 is referred to as a "physical signature authenticator." The physical signature authenticator is implemented as executable instructions programmed and residing within memory and/or a non-transitory computer-readable (processor-readable) storage medium and executed by one or more processors of one or more devices. The processor(s) of the device(s) that executes the physical signature authenticator are specifically configured and programmed to process the physical signature authenticator. The physical signature authenticator has access to one or more network connections during its processing. The connections can be wired, wireless, or a combination of wired and wireless.

In an embodiment, the device that executes the physical signature authenticator is cloud 110. In an embodiment, the device that executes the physical signature authenticator is server 110. In an embodiment, the cloud/server 110 configured as a portal.

In an embodiment, the physical signature authenticator is all of, or some combination of model(s) 113, 114, 115, and/or 116.

At 210, physical signature authenticator receives a code and a document from a provider.

In an embodiment, at 211, the physical signature authenticator identifies the code as a registered code generated for the user during a registration of the user to a portal signature authentication service.

In an embodiment, at 212, the physical signature authenticator receives the code based on a provide device 130 scanning the code from a display of a user device 120 causing redirection of the provider device 130 to a link associated with method 200 and the document being provided by the provider attached to the code.

At 220, the physical signature authenticator identifies the user from the code.

In an embodiment, at 221, the physical signature authenticator decodes the code to identify a user device identifier for a user device 120 operated by the user.

In an embodiment of 221 and at 222, the physical signature authenticator decodes the code as a Quick Response (QR) code issued to the user during a registration of the user to a portal.

At 230, the physical signature authenticator forwards the document to the user.

In an embodiment, at 231, the physical signature authenticator forwards the document with tags inserted around one or more signature lines within the document. The tags inserted by a provider application 133 to a provider device 130 of the provider.

At 240, the physical signature authenticator receives a physically signed document from the user.

In an embodiment of 231 and 240, at 241, the physical signature authenticator receives the physically signed document with an image of a physical signature of the user inserted on the one or more signature lines by a user app 123 when the user accepts the document after the user app 123 displays the document for viewing by the user on the user device 120.

At 250, the physical signature authenticator forwards the physically signed document to the provider.

At 260, the physical signature authenticator maintains a record for the document, the provider, the user, and an indication that the user provided the physically signed document. The record does not include the document or the physically signed document.

In an embodiment of 241 and 260, at 261, the physical signature authenticator maintains with the record a first cryptographic unique value for the document and a second cryptographic unique value for the physically signed document.

In an embodiment of 261 and at 262, the physical signature authenticator maintains the first cryptographic value as a cryptographic digital signature on the document by the provider device 130 using a provider device key.

In an embodiment of 262, and at 263, the physical signature authenticator maintains the second cryptographic value as a cryptographic digital signature on the physically signed document by the user device 120 using a user device key.

In an embodiment of 261 and 260, at 264, the physical signature authenticator calculates the first and second cryptographic values as hash values on identifiers for the document, the provider, the user, the physically signed document, a current date, and a current time of day.

In an embodiment of 261 and 260, at 265, the physical signature authenticator provides an interface for searching and accessing the record to the provider and to the user to establish proof that the document was physically signed by the user.

Figure 3:
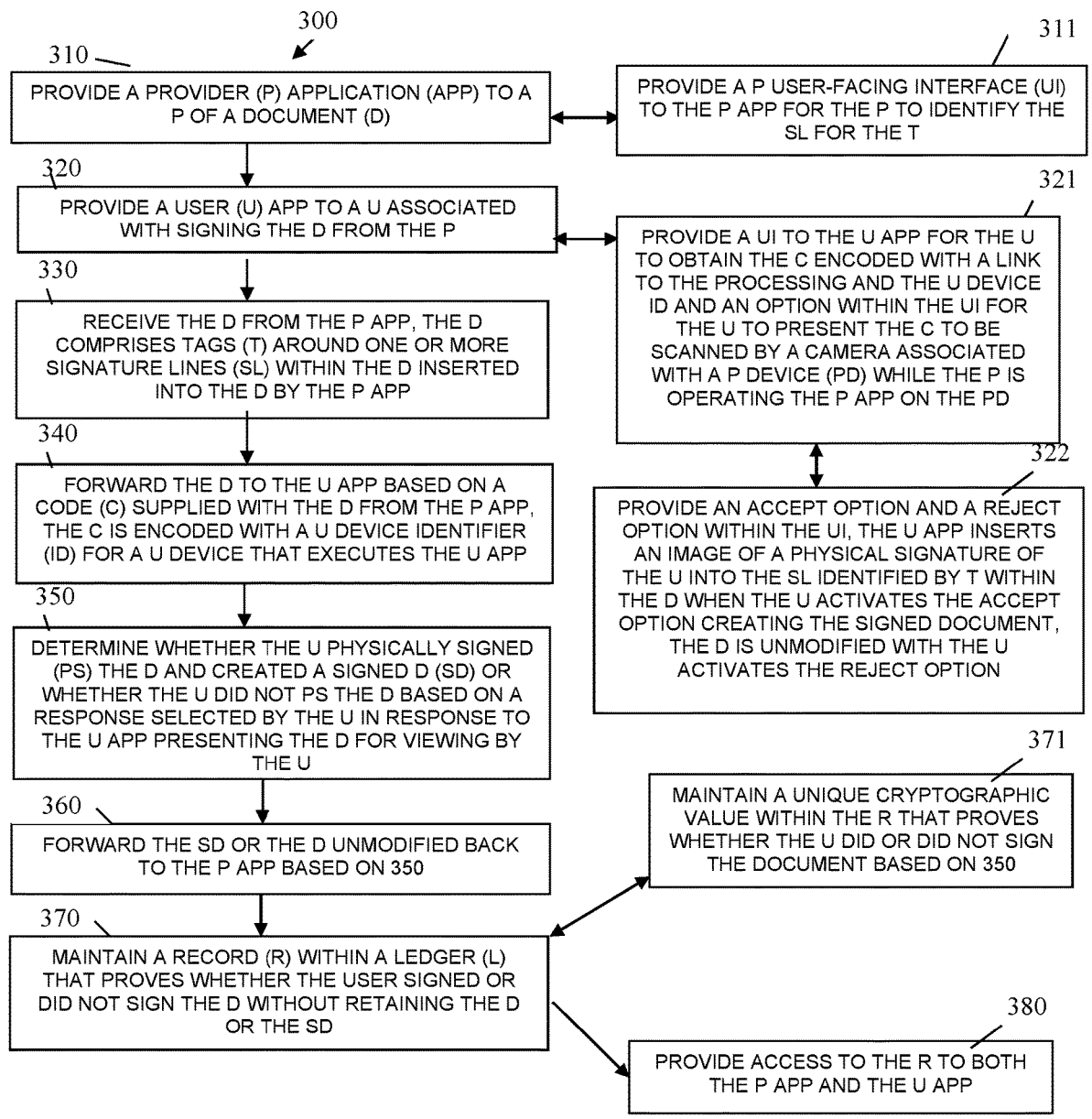
FIG. 3 is a diagram of another method for authorizing a physical signature via a portal, according to an example embodiment.

FIG. 3 is a diagram of another method 300 for authorizing a physical signature via a portal, according to an example embodiment. The software module(s) that implements the method 300 is referred to as a "portal signature authenticator and ledger service." The portal signature authenticator and ledger service is implemented as executable instructions programmed and residing within memory and/or a non-transitory computer-readable (processor-readable) storage medium and executed by one or more devices. The processor(s) of the device(s) that executes the portal signature authenticator and ledger service are specifically configured and programmed to process the portal signature authenticator and ledger service. The portal signature authenticator and ledger service has access to one or more network connections during its processing. The network connections can be wired, wireless, or a combination of wired and wireless.

In an embodiment, the device that executes the portal signature authenticator and ledger service is cloud 110. In an embodiment, the device that executes the portal signature authenticator and ledger service is server 110. In an embodiment, cloud/server 110 is configured as a portal to apps 133 and 123.

In an embodiment, the portal signature authenticator and ledger service is all of, or some combination of 113, 114, 115, 116, and/or method 200.

The portal signature authenticator and ledger service presents another and, in some ways, an enhanced processing perspective from that which was discussed above with system 100 and method 200.

At 310, the portal signature authenticator and ledger service provides a provider app 133 to a provider of a document.

In an embodiment, at 311, the portal signature authenticator and ledger service provides a provider user-facing interface to the provider app 133 for the provider to identify one or more signature lines within the document for the provider app 133 to insert tags thereon.

In an embodiment, at 320, the portal signature authenticator and ledger service provides a user app 123 to a user associated with signing the document provided from the provider.

In an embodiment, at 321, the portal signature authenticator and ledger service provides a user-facing interface to the user app 123 for the user to obtain a code encoded with a link to the portal signature authenticator and ledger service, a user device identifier for a user device 120, and an option within the user-facing interface for the user to present the code to be scanned by a camera associated with a provider device 130 while the provider is operating the provider app 133 on the provider device 130.

In an embodiment of 321 and at 322, the portal signature authenticator and ledger service provides an accept option and a reject option within the user-facing interface of user app 123. The user app 123 inserts an image of a physical signature of the user into the one or more signature lines identified by tags within the document when the user activates the accept option creating a signed document. When the user activates the reject option the document is unmodified.

At 330, the portal signature authenticator and ledger service receives the document from the provider app 133, the document comprises the tags around one or more signature lines within the document inserted into the document by the provider app 133.

At 340, the portal signature authenticator and ledger service forwards the document to the user app 123 based on a code supplied with the document from the provider app 133. The code is encoded with the user device identifier for the user device 120 that executes the user app 123.

At 350, the portal signature authenticator and ledger service determines whether the user physically signed the document and created a signed document or whether the user did not physically sign the document based on a response selected by the user in response to the user app 123 presenting the document for viewing by the user.

At 360, the portal signature authenticator and ledger service forwards the signed document of the document unmodified back to the provider app 133 based on 350.

At 370, the portal signature authenticator and ledger service maintains a record within a ledger that proves whether the user signed or did not sign the document without retaining the document and without retaining the signed document.

In an embodiment, at 371, the portal signature authenticator and ledger service maintains a unique cryptographic value within the record that proves whether the user did or did not sign the document based on 350.

In an embodiment, at 380, the portal signature authenticator and ledger service provides access to the record to both the provider app 133 and the user app 123.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving a code and a document supplied by a provider;
   identifying a user from the code;
   forwarding the document to the user with tags inserted around one or more signature lines within the document, wherein the tags inserted by a provider application on a provider device of the provider;
   receiving a physically signed document from the user with an image of a physical signature of the user inserted on the one or more signatures lines by a user application on a user device when the user accepts the document after the user application displays the document for viewing by the user on the user device;
   forwarding the physically signed document to the provider; and
   maintaining a record for the document, the provider, the user, and an indication that the user provided the physically signed document, wherein the record does not include the document or the physically signed document, wherein maintaining further includes:
   maintaining within the record a first cryptographic unique value for the document and second cryptographic unique value for the physically signed document; and
   calculating the first cryptographic unique value and the second cryptographic unique values as hash values on identifiers for the document, the provider, the user, the physically signed document, a current calendar date, and a current time of day.

2. The method of claim 1, wherein receiving the code further includes identifying the code as a registered code generated for the user during a registration of the user to a portal.

3. The method of claim 1, wherein receiving the code further includes receiving the code based on a provider device scanning the code from a display of a user device causing redirection on the provider device to a link associated with the method having the document of the provider attached to the code.

4. The method of claim 3, wherein identifying further includes decoding the code to identify a user device identifier for a user device operated by the user.

5. The method of claim 4, wherein decoding further includes decoding the code as a Quick Response (QR) code issued to the user during a registration of the user to a portal.

6. The method of claim 1, maintaining further includes maintaining a first hash value as a cryptographic digital signature on the document for the provider device using a provider device key.

7. The method of claim 6, maintaining further includes maintaining a second hash value as a second cryptographic digital signature on the physically signed document by the user device using a user device key.

8. The method of claim 1 further comprising, providing an interface for searching and accessing the record to the provider and the user as proof the document was physically signed by the user.

\* \* \* \* \*